United States Patent
Bishop (10) Patent No.: US 8,936,320 B2
(45) Date of Patent: *Jan. 20, 2015

(54) METHOD AND SYSTEM FOR SOLUTION MINING

(75) Inventor: William M. Bishop, Katy, TX (US)

(73) Assignee: Pinnacle Potash International, Ltd., Austin, TX (US)

( * ) Notice: Subject to any disclaimer, the term of this patent is extended or adjusted under 35 U.S.C. 154(b) by 916 days.

This patent is subject to a terminal disclaimer.

(21) Appl. No.: 12/959,377

(22) Filed: Dec. 3, 2010

(65) Prior Publication Data

US 2011/0080035 A1   Apr. 7, 2011

Related U.S. Application Data (63) Continuation of application No. 12/316,398, filed on Dec. 13, 2008, now Pat. No. 7,857,396.

(60) Provisional application No. 61/132,294, filed on Jun. 17, 2008.

(51) Int. Cl.
*E21C 41/00* (2006.01)
*F16L 9/19* (2006.01)
*E21B 43/28* (2006.01)

(52) U.S. Cl.
CPC *F16L 9/19* (2013.01); *E21B 43/281* (2013.01)
USPC .................................................. 299/7; 299/4

(58) Field of Classification Search
USPC ........................................................ 299/3–7
See application file for complete search history.

(56) References Cited

U.S. PATENT DOCUMENTS

| 2,099,493 A | 6/1936 | Mahoney |
| 2,161,800 A | 6/1939 | Cross |

(Continued)

FOREIGN PATENT DOCUMENTS

| CN | 201218675 | 4/2009 |
| CN | 101665259 | 3/2010 |
| EP | 0 889 299 A2 | 7/1999 |

OTHER PUBLICATIONS

International Search Report and Written Opinion for corresponding International Application No. PCT/US 2009/002963.

(Continued)

*Primary Examiner* — Sunil Singh
(74) *Attorney, Agent, or Firm* — Stephen S. Hodgson (57) ABSTRACT

A relatively warm mineral deposit is solution mined by injecting fluid through a well drilled into the deposit and dissolving the mineral to form a production brine. Warm production brine is cooled at the surface using a heat exchanger as a crystallizer to precipitate the mineral in the exchanger and form a slurry. Crystals of the mineral in the slurry are recovered in a separation plant leaving a relatively cool, dilute or depleted brine, which is conveyed through the heat exchanger for cooling the production brine and then injected into the mineral deposit to dissolve more mineral thereby providing a continuous process. A pipe-in-pipe heat exchanger is preferably used and in a manner so that the heat exchanger also serves as a primary means for conveying the production fluid and/or slurry from the well to the separation plant. This method extracts and recovers the desired mineral(s), recovers much of the heat in the production brine, accelerates the solution mining process since the injection fluid has been warmed, reduces salting in the production string, is relatively inexpensive to install and maintain, and does not require a source of energy for cooling the production brine such as electricity for a refrigeration system.

10 Claims, 3 Drawing Sheets

(56) References Cited

U.S. PATENT DOCUMENTS

| | | |
|---|---|---|
| 2,869,328 A | 1/1959 | Gibson et al. |
| 3,034,773 A | 5/1962 | Legatski |
| 3,058,729 A | 10/1962 | Dahms et al. |
| 3,348,883 A | 10/1967 | Jacoby et al. |
| 3,386,768 A | 6/1968 | Jacoby et al. |
| 3,918,916 A | 11/1975 | Garrett |
| 4,052,857 A | 10/1977 | Altschuler |
| 4,283,372 A | 8/1981 | Frint et al. |
| 4,815,790 A | 3/1989 | Rosar et al. |
| 5,669,734 A | 9/1997 | Becnel, Jr. et al. |
| 6,022,080 A | 2/2000 | Gruschow et al. |
| 7,681,922 B2 | 3/2010 | Galatello Adamo et al. |
| 7,857,396 B2 * | 12/2010 | Bishop .............................. 299/7 |
| 2006/0039842 A1 | 2/2006 | Day et al. |

OTHER PUBLICATIONS

Office Actions in the parent application.

* cited by examiner

METHOD AND SYSTEM FOR SOLUTION MINING

CROSS REFERENCE TO RELATED APPLICATION

This is a continuation of U.S. patent application Ser. No. 12/316,398, filed Dec. 13, 2008, which is incorporated by reference and which claims priority to U.S. Provisional Patent Application Ser. No. 61/132,294 filed by the inventor on Jun. 17, 2008, which is incorporated by reference.

BACKGROUND OF THE INVENTION

1. Field of the Invention

The present invention pertains to mining and more particularly to solution mining of soluble minerals.

2. Description of the Related Art

Many valuable minerals are obtained by solution mining of subsurface ores including evaporites. Typically, a cavern is formed by injecting a solvent, which is typically water, and saturating the resulting solution with a desired mineral to the extent possible before bringing it to the surface as a produced brine. The solubility of the desired mineral in the produced brine is a function of temperature, and the underground deposit of the desired mineral is often at a temperature greater than the surface ambient temperature so that a relatively high concentration of the desired mineral is in the produced brine. At the surface, the produced brine is often transported by pipeline to a processing plant, where it is cooled in refrigerated heat exchangers to below ambient temperature in order to cause a portion of the dissolved desired mineral to precipitate due to the reduction in temperature. Alternatively, the temperature of the produced brine may be reduced by evaporation of the solvent, which is typically water, to cause precipitation of solid crystals of the desired mineral. A slurry of the crystals of the desired mineral is processed to recover the crystals, and a depleted brine remains after the crystals are removed. In selective solution mining, the depleted brine can be returned to the source cavern. In non-selective mining, the depleted brine is disposed of as a waste product. Cooling by refrigeration and evaporation is energy intensive and expensive.

U.S. Pat. No. 3,348,883, issued to Jacoby et al. and incorporated by reference, teaches the use of two separate wells drilled into a relatively high temperature mineral deposit, where one of the wells is used for injection and one for production. A warm production brine is produced to the surface, where it is cooled in an evaporative heat exchanger to recover the desired minerals. This is not an optimum process in that evaporation can cause undesired minerals, such as halite, to precipitate, and the thermal energy in the production brine is wasted. With evaporative cooling, very little of the original production brine will remain, and what does remain will be highly contaminated and not suitable for injection into the mineral deposit. In the case of either partial or complete evaporation, a significant quantity of water must be replaced.

U.S. Pat. No. 3,386,768, issued to Jacoby et al. and incorporated by reference, circulates heated water or oil through annuli in a production well to maintain temperature in a production brine in an attempt to prevent salting, which blocks the flow passage in the well due to the deposition of salt in the flow passage. Water or oil is heated in a heat exchanger at the surface and passed downwardly through an annular space in a production well adjacent to a tube through which the production brine flows upwardly, and upon reaching the bottom of the production well, the oil or water returns to the heat exchanger through another annular space.

Another patent, U.S. Pat. No. 5,669,734, issued to Becnel, Jr. et al. and incorporated by reference, described a process for making an underground storage cavern for natural gas in a bedded or domal salt deposit. The '734 patent addressed the problem of accelerating the formation of underground caverns in cold climates by preheating fresh injection water by recovering heat in a produced brine. Halite, which is sodium chloride salt, was solution mined with warm, fresh injection water to increase the rate at which the storage cavern was created, and ambient, cold, fresh water was warmed using a heat exchanger between the cold, fresh water and warm produced brine to provide the warm, fresh injection water. The purpose of the process described in the '734 patent was to make a storage cavern, so there was no discussion of recovering halite from the produced brine, but it would not have been feasible to obtain halite by simply lowering the temperature of the brine because the solubility of halite is only a very weak function of temperature. Heating the fresh injection water increased the rate of dissolution of the halite in the deposit, but did not substantially change the concentration of the halite in the produced brine.

U.S. Pat. No. 3,058,729, issued to Dahms et al. and incorporated by reference, describes a method for solution mining potash, potassium chloride, in which a water solution was injected into a potash deposit and left for months to dissolve the potassium chloride. Brine rich in potassium chloride was produced and conveyed to a shallow cooling pond, where the ambient temperature was relatively cold. Potassium chloride crystals deposited in the pond, and a mother liquor was withdrawn from the pond. A small portion of the mother liquor was purged, and water was added to a large portion of the mother liquor to form the water solution that was fed to the potash deposit. This method requires a cold climate or supplemental means for cooling the produced brine.

Solution mining of potash, potassium chloride, is further described in U.S. Pat. No. 3,918,916, issued to Garrett and incorporated by reference. In the '916 patent, as described with reference to FIG. 6 therein, brine was produced from a potash deposit and initially cooled in a multi-stage vacuum growth-type crystallizer, cooled further in a heat exchange crystallizer that included shell and tube heat exchangers, then cooled further in an atmospheric crystallizing station in which brine flows downwardly over a series of baffles while cold, atmospheric air is drawn upwardly and exhausted by a fan and then optionally, depending on the ambient temperature, cooled further with a refrigerative crystallizer. The produced brine became a slurry containing potassium chloride crystals as it was cooled. The potassium chloride crystals were separated and recovered using physical-separation equipment, such as a cyclone, leaving a brine solution that contained a lower concentration of potassium chloride referred to as a depleted brine. A portion of the depleted brine was recirculated to the shell and tube heat exchangers in the heat exchange crystallizer to cool the produced brine, which warmed the depleted brine. Fresh water was added to the warmed, depleted brine to form a solution that was injected into the potash deposit for dissolving the potassium chloride and forming the produced brine. The method described in the '916 patent requires equipment that is relatively expensive, complex and difficult to maintain and requires a high amount of energy to operate.

SUMMARY OF THE INVENTION

The present invention provides in one embodiment a process for solution mining, in which an injection conduit is provided into a mineral deposit having a desired mineral. The injection conduit is adapted to convey an injection fluid into the mineral deposit for dissolving the desired mineral and forming a production brine. A production conduit is provided into the mineral deposit and is adapted to convey the production brine to the surface of the earth. Injection fluid is injected into the injection conduit, which forces the production brine to flow through the production conduit. The production brine is cooled as it is conveyed through a conveyance conduit and one or more heat exchangers to a separation plant. Cooling the production brine causes the desired mineral to precipitate thereby forming a slurry containing desired solid mineral crystals in a brine solution. The desired solid mineral crystals are separated from the brine solution in the separation plant, thereby forming a stream of liquid depleted brine and recovering solid mineral crystal product. The depleted brine is conveyed through the one or more heat exchangers to the injection conduit and injected as all or part of the injection fluid. Heat is exchanged between the production brine and the depleted brine in the one or more heat exchangers for cooling the production brine and for heating the depleted brine. The crystallization of the solid mineral crystal product is due to a reduction in temperature of the production brine that occurs between the mineral deposit and the separation plant due to a loss of heat from the production brine. The loss of heat from the production brine is due essentially to a transfer of heat from the production brine to the depleted brine in the heat exchanger and to loss of heat from the production brine to the ambient environment while being conveyed from the mineral deposit in the production conduit, the one or more heat exchangers, and the conveyance conduit to the separation plant. Preferably, no powered heat exchangers are used in the process, and preferably, the only process energy consumed is the energy required for pumping the fluid through the mining system. The depleted brine is preferably warmed back to nearly the temperature of the mineral deposit, preferably without the use of external heating, which increases the leaching rate and the saturation level.

The present invention provides in another embodiment a process for solution mining a mineral from an underground mineral source. The process includes providing an injection conduit into the mineral source adapted to convey an injection fluid into the mineral source for dissolving the mineral and forming a concentrated production brine and providing a production conduit into the mineral source adapted to convey the concentrated production brine to the surface of the earth. The injection fluid is injected into the injection conduit, and the concentrated production brine is conveyed to mineral-extraction equipment, where the mineral is extracted from the concentrated production brine to form a dilute brine stream. A heat exchanger is provided to exchange heat between the relatively warm concentrated production brine and the relatively cool dilute brine stream for cooling down the concentrated production brine so that a portion of the mineral will crystallize due to the lower temperature. The mineral-extraction equipment removes the crystallized mineral to form a mineral stream or slurry. The dilute brine stream is conveyed to the injection conduit, where it is used as the injection fluid, which may also contain some make-up water if needed. Alternatively, make-up water can be added by a separate pipe to the heat exchanger.

While the words concentrated and dilute have been used to identify certain fluid streams, in this invention brine remains essentially saturated after dissolving the mineral, but the amount of dissolved mineral in the fluid stream varies with temperature. A saturated brine having a certain temperature upon exit from a production well is referred to as concentrated brine. Upon cooling, crystals will form in the concentrated brine, forming a slurry of liquid with solid particles in the liquid. The solid particles can be removed from the slurry by various types of separation equipment. After the solid particles are removed from the slurry, a saturated brine remains that has a lower temperature than the concentrated brine, which is referred to as a dilute or depleted brine stream.

In a preferred embodiment, a pipe-in-pipe heat exchanger is used for exchanging heat between the concentrated production brine and the dilute brine stream, and preferably, the pipe-in-pipe heat exchanger also serves as a significant means for conveying the concentrated production brine to the mineral-extraction equipment and for conveying the dilute brine stream to the injection conduit. Preferably, the concentrated production brine is seeded to promote crystallization of the mineral, preferably with mineral particles recovered from the concentrated production brine.

The present invention provides in another embodiment a system adapted for extraction of a mineral from an underground source of the mineral, where an injection tube extends from the surface of the earth into the underground source of the mineral and a production tube extends into the underground source of the mineral for conveying a warm, concentrated production brine containing the mineral from the underground source to the surface of the earth. Equipment for obtaining the mineral from the concentrated production brine provides a relatively cool, dilute brine obtained after the mineral is removed from the concentrated production brine. A heat exchanger is provided to exchange heat between the relatively cool, dilute brine and the relatively warm, concentrated production brine, and the cool, dilute brine is warmed to provide an injection fluid, which is pumped into the injection tube. The heat exchanger is preferably a pipe-in-pipe heat exchanger, but other types of exchangers such as a shell and tube can be used. The equipment for obtaining the mineral from the concentrated production brine preferably includes a separator, which is preferably a fine aperture sieve, more preferably a sieve bend separator, such as a VARISIEVE® sieve bend separator, preferably followed by a centrifuge. In the case of carnallite processing, the separator is preferably followed by a cracker (a decomposition tank) and then preferably by a centrifuge. The underflow from the centrifuge includes small particles, slimes, which can be used as seeds to promote crystallization in the production brine as it cools in the heat exchanger. In one embodiment, a vortex separator is used to recover seed particles from the dilute, return brine, which contains the slime. The dilute brine carries the seed particles back to the heat exchanger, and the vortex separator removes some seed particles, which are then injected into the production brine near the warm end of the heat exchanger. A vortex separator has been described, but any device capable of separating the slimes or small seed particles from the liquid, dilute, return brine can be used. In another embodiment, separation and sizing equipment is provided so that a portion of recovered mineral is separated by particle size, and a desired number of particles of a desired size are injected into the dilute, return brine for recovery in the vortex separator and injection into the warm production brine to promote formation of crystals of a desired size.

One embodiment of the invention provides a process for mining a mineral from a site having an underground mineral source, where the site has been adapted with an injection conduit into the mineral source for conveying an injection fluid into the mineral source for dissolving the mineral and forming a concentrated production brine, and where the site has been further adapted with a production conduit into the mineral source for conveying the concentrated production brine to the surface of the earth. The process includes injecting the injection fluid into the injection conduit, conveying the concentrated production brine to mineral-extraction equipment, extracting the mineral from the concentrated production brine thereby forming a dilute brine stream and a mineral stream, disposing of the dilute brine stream, introducing a mineral-dissolving fluid to a heat exchanger; and exchanging heat between the concentrated production brine and the mineral-dissolving fluid in the heat exchanger. In this embodiment, the mineral-dissolving fluid cools the concentrated production brine thereby forming crystallized mineral particles in the concentrated production brine, while the mineral-dissolving fluid is heated by the concentrated production brine. The injection fluid comprises the mineral-dissolving fluid after it is heated in the heat exchanger, and the mineral-dissolving fluid is typically fresh or saline water.

In another aspect of the present invention, a method is provided for preparing a site for solution mining an underground source of mineral, which includes installing injection tubing and production tubing extending between the surface of the earth and the underground source, installing equipment adapted for obtaining the mineral from a production brine, installing a heat exchanger between the production tubing and the equipment adapted for obtaining the mineral; and installing piping and a pump adapted to circulate fluid from the production tubing, through the heat exchanger, through the equipment adapted for obtaining the mineral and down the injection tubing, wherein the heat exchanger is adapted to exchange heat between fluid from the production tubing and fluid from the equipment adapted for obtaining the mineral, and wherein the heat exchanger is adapted to serve as the primary and most significant means for cooling the fluid from the production tubing and thereby precipitating crystals of the mineral.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

Valuable evaporite minerals are usually obtained by means of conventional mining, by solution mining, or by recovering the minerals from highly saturated lakes, such as the Dead Sea. In most of these cases it is necessary to form and process a solution of the minerals such that the desired mineral(s) precipitates from the solution. The present invention pertains to solution mining, where water is pumped into an evaporite ore body, typically a subterranean deposit. A desired mineral in the deposit is dissolved, and a solution containing the desired mineral is conveyed to the surface. At this point the desired mineral is recovered from the solution. One way to do this is by evaporation, either by using evaporation ponds in hot dry climates, or by mechanical heating and evaporation in other climates. These two methods are typically used to produce sodium chloride salt, which is halite. Another method is to use refrigeration in a process plant to chill the nearly saturated solution produced by solution mining, causing the minerals to precipitate. Refrigeration is effective for minerals that have a strongly temperature dependent solubility, such as ores of potash (sylvite or carnallite, for example). The present invention concerns these latter types of minerals, where solubility is dependent on temperature.

Large halite salt deposits, such as salt domes or those in large depositional basins, have a tendency to be warmer than other areas because of the higher thermal conductivity of the salt. If the deposit is deep enough, the higher temperature at the bottom of the formation produces higher temperatures throughout the deposit by virtue of the salt's high thermal conductivity. Typically, these temperatures are greater than the normal geothermal gradient of about 1.8° F. per hundred feet. Alternatively, if an evaporite is simply deep with no associated large body of salt, the geothermal gradient itself can significantly elevate the temperature of the evaporite over that at the surface. By using solution mining, both of these cases allow for the possibility of precipitating any dissolved minerals by cooling the production brine to ambient temperature at the surface. What minerals and how much of each will precipitate will depend on the temperature drop experienced at the surface and on the phase diagram for the system of dissolved minerals. It is desirable to maintain the temperature of a produced brine as high as possible as it rises to the surface so that the production string will not salt up and become blocked due to cooling-induced precipitation on the pipe wall. The temperature drop in a production string can be minimized by insulating the production string, and minerals that precipitate on the pipe wall can be removed by flushing the production string with fresh water periodically.

Figure 1A:
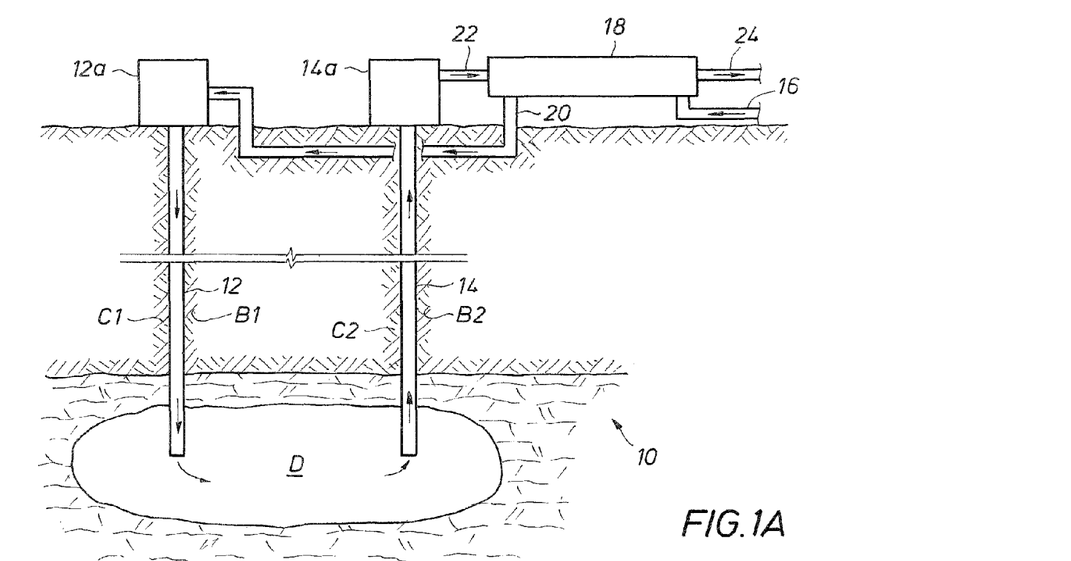
FIG. 1a is a schematic representation of a solution mining process according to the present invention in which an injection conduit is installed in one well that extends into a mineral deposit, and a production conduit is installed in another well that extends into the mineral deposit.

Turning now to the drawings, FIG. 1a shows a system 10 for solution mining a mineral deposit D, according to the present invention. An injection well 12 is placed into mineral deposit D by drilling a well bore B1 from the surface into the deposit, placing injection conduit 12 in the well, and pumping cement C1 around the injection conduit to seal the annular space between the injection conduit 12 and the wall of the earthen well bore B1. An injection well head 12a provides access to injection well 12 and provides a connection point with appropriate valves and pipe connections. A production well 14 having a production well head 14a is similarly installed in a well bore B2 and sealed with cement C2 to provide a conduit for producing fluid from deposit D. Mineral deposit D may be fractured to provide a flow path through deposit D from injection well 12 to production well 14, such as by pumping a fluid down injection well 12 at very high pressure. A solvent, which is typically a water solution, is fed through a pipe 16 to a heat exchanger 18, which heats the solvent. The heated solvent flows through a pipe 20 to injection well head 12a and down injection well 12 into mineral deposit D. The solvent flows through mineral deposit D, dissolving one or more minerals in the deposit and forming a production brine having a concentration of a desired dissolved mineral(s). The temperature of deposit D and of the production brine is higher than the surface ambient temperature. The solubility of the desired mineral(s) is temperature dependent, where saturation in the production brine is at a higher concentration at a high temperature as compared to a low temperature. Thus, a greater quantity of the desired mineral can be dissolved in a given volume of the solvent at a higher temperature than at a lower temperature. The production brine flows upwardly through production well 14 to production well head 14a and through a pipe 22 to heat exchanger 18. The production brine is cooled as it flows through heat exchanger 18, causing solid crystals of the desired mineral(s) to form due to lower solubility at the lower temperature. A slurry of the solid crystals of the desired mineral(s) in the produced brine flows through a pipe 24, and the crystals are separated and recovered as explained below.

Figure 1B:
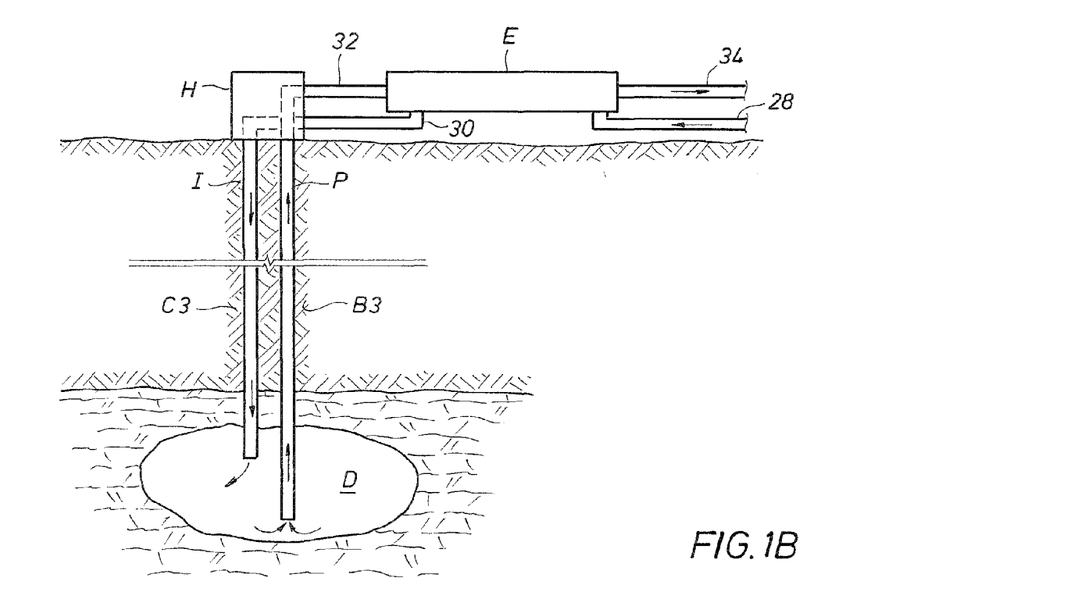
FIG. 1b is a schematic representation of a solution mining process according to the present invention that uses a dual completion in which an injection conduit and a production conduit are each installed in a single well that extends into a mineral deposit.

In FIG. 1b, a single well bore B3 is drilled through the earth into the mineral deposit D. An injection conduit I and a production conduit P are sealed in the well bore B3 with a cement C3. A well head H provides valves and connection points for the injection conduit I and the production conduit P. Since injection conduit I and production conduit P are in close proximity, it may not be necessary to fracture deposit D. A water solution is fed through a line 28 to a heat exchanger E, where the solution is warmed, and then through a line 30 to injection conduit I. A desired mineral in deposit D is dissolved by the water solution to produce a warm brine solution rich in the desired mineral, which is produced through production conduit P. The produced brine flows through a line 32 and is cooled in heat exchanger E, precipitating crystals of the desired mineral and forming a slurry, which flows through a line 34 to physical-separation equipment (not shown).

Figure 2:
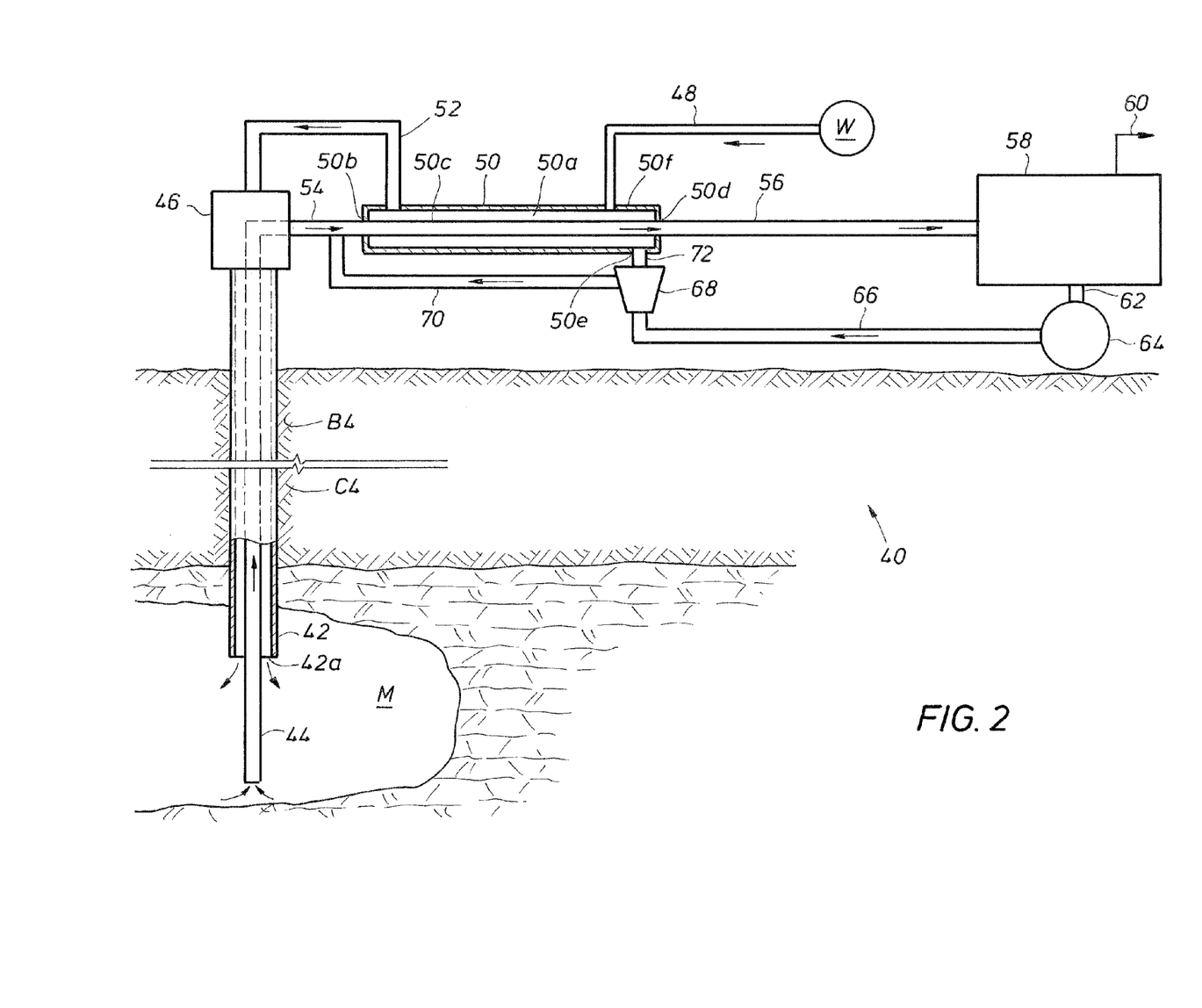
FIG. 2 is a simplified schematic representation of a solution mining process, according to the present invention, illustrating, in particular, a heat exchanger for crystallizing a desired mineral.

FIG. 2 provides a simplified drawing of a solution mining process 40, according to the present invention. In FIG. 2, a single well bore B4 is drilled through the earth into a mineral deposit M. A casing or outer pipe 42 is sealed in well bore B4 with a cement C4. An inner pipe 44 is placed inside outer pipe 42, forming a concentric well string. An annular space 42a is defined by the outside surface of inner pipe 44 and the inside surface of outer pipe 42. Annular space 42a serves as an injection conduit, while inner pipe 44 serves as a production conduit. A water solution or solvent is fed through annular space 42a to mineral deposit M. A desired mineral(s) is dissolved, and a brine is formed that has a relatively high concentration of the desired mineral(s). The brine, which is relatively warm due to the relatively warm temperature of the mineral deposit M, is produced through inner pipe 44 and conveyed to a well head 46. The concentric well string serves as a pipe-in-pipe heat exchanger, which provides advantages—the production brine tends to retain its relatively warm temperature, which minimizes salting out in the production tubing, and the injection fluid can be delivered to the deposit at about the same temperature as in the deposit, which helps to prevent cooling in the deposit and allows dissolution to take place at as high of a temperature as is naturally possible. While normally production will be through inner pipe 44, either inner pipe 44 or annular space 42a can be used for producing the brine, and the flow direction can be reversed, particularly for removing salt from the production conduit. Any of the well configurations shown in FIGS. 1a, 1b and 2 can be used, and any number of wells can be used to mine a mineral deposit.

With reference to FIG. 2, during start-up, water W is conveyed through a pipe 48 to a pipe-in-pipe heat exchanger 50, where the water flows through an annular space 50a inside heat exchanger 50 to a pipe 52 that runs to well head 46 and provides a fluid connection with annular space 42a in the concentric well string. Fresh water is thus conveyed through injection conduit annular space 42a to mineral deposit M for dissolving the desired mineral(s). As the water equilibrates to the temperature in the mineral deposit M, it dissolves the desired mineral(s) and forms a production brine that has a relatively high concentration of the desired mineral(s), the solubility of which is temperature dependent. The mineral-rich brine thus formed is produced through inner pipe 44 and flows through well head 46 through a pipe 54 to an inlet 50b of an inside pipe 50c within heat exchanger 50. Inside pipe 50c runs through the length of heat exchanger 50 to an outlet 50d to which a pipe 56 is connected. The produced, mineral-rich brine is cooled as heat in the produced brine is transferred to the water flowing through the annular space 50a. Since the solubility of the desired mineral(s) depends on the temperature of the solution that it is in, the desired mineral(s) precipitates as solid crystals within inside pipe 50c as the temperature of the produced brine drops, forming a slurry of the crystals in the brine solution. The slurry flows through line 56 to a separation plant 58. Separation or mineral-extraction equipment inside separation plant 58 removes the solid crystals of the desired mineral(s) from the slurry and leaves a brine solution from which the crystals have been removed that is referred to as a dilute or depleted brine. The solid crystals of the desired mineral(s) are recovered as a product 60. The depleted brine is at a substantially lower temperature than the warm, rich produced brine in line 54 and has a substantially lower concentration of the desired mineral(s) dissolved in it. The depleted brine is at about ambient temperature.

After precipitated mineral(s) is removed from the production brine and recovered as product 60, the dilute or depleted brine is recirculated to the well, flowing through a pipe 62 to a high-pressure pump 64. Pump 64 pumps the depleted brine through a pipe 66 to the annular space 50a inside heat exchanger 50 to recirculate the depleted brine for additional solution mining of mineral of mineral deposit M. Pump 64 boosts the pressure of the dilute (return) brine so that it is sufficient to carry this brine to and through heat exchanger 50, into the cavern in deposit M, and then back through the production tubing 44, the heat exchanger 50, and back to the separation plant 58.

In separation plant 58, mineral particles, which are preferably sorted by size, are injected into the depleted brine for use in seeding the produced brine in line 54, although this step is not shown in FIG. 2. Separation plant 58 should have suitable equipment for separating crystals of the desired mineral from the slurry, preferably separating the crystals according to size, and injecting a portion of the crystals into the depleted brine for use in seeding the produced brine. The crystals serve as nucleation points for formation of crystals as the temperature of the brine drops. Further discussion on seeding is provided below. The depleted brine in pipe 66, which contains seed, mineral crystals, flows through a vortex separator 68, which removes most of the seed. Mineral crystals in a purge stream flow through a pipe 70 for injection into the produced brine in line 54 upstream of heat exchanger inlet 50b. A vortex separator is illustrated, but any equipment suitable for removing the seed crystals can be used. Alternatively, a seed solution can be conveyed from the separation plant 58 to the warm inlet 50b of heat exchanger 50. After the seed crystals are removed from the depleted return brine in vortex separator 68, the depleted return brine flows through a pipe 72 into an inlet 50e into the annular space 50a at a cold end of heat exchanger 50 near produced brine outlet 50d. Inlet 50e provides an opening through an outer pipe 50f that defines the outer surface of heat exchanger 50. The annular space 50a is defined by an inside surface of the outer pipe 50f and an outside surface of the inside pipe 50c.

The depleted brine flowing out of vortex separator 68 into line 72 is generally at or near ambient temperature, which is generally relatively cool as compared to the formation temperature inside mineral deposit M and the temperature of the produced brine in line 54. Heat exchanger 50 is preferably a very long pipe-in-pipe heat exchanger or a number of shorter pipe-in-pipe heat exchangers arranged in series. Alternatively, heat exchanger 50 can be a number of shell and tube heat exchangers arranged in parallel, or any suitable means for heat exchange according to the present invention can be used as well.

As shown in FIG. 2, relatively cool depleted brine flows into annular space 50a of heat exchanger 50 through inlet 50e. The depleted brine mixes with water from source W in annular space 50a, forming an injection fluid, and after start-up, the amount of water W can be reduced according to need. The injection fluid flows through annular space 50a countercurrent to the flow of the produced brine within inside pipe 50c. Thermal energy in the warm, rich production brine flows through the wall of the inside pipe 50c into the injection fluid in the annular space 50a, which both cools the produced brine and warms the injection fluid that comprises the depleted brine from line 72 and the make-up water from line 48. Some thermal energy will also likely be lost to the ambient environment through the wall of the outer pipe 50f. In fact, it may be desirable to bury heat exchanger 50 below the surface of the ground, in which case the earth's surface provides a heat sink at a relatively constant temperature.

As the produced brine cools, the amount of the desired mineral(s) that can be dissolved in the produced brine is reduced. Crystals of the desired mineral(s) form, especially around the nucleation points provided by the seeds introduced to the produced brine through line 70 from vortex separator 68, as the temperature of the produced brine is lowered due to transfer of thermal energy from the produced brine to the depleted brine and make-up water injection fluid in annular space 50a in heat exchanger 50. A slurry is formed as the produced brine flows from the warm end inlet 50b to the cool end outlet 50d, which is conveyed through line 56 to separation plant 58. Solid crystals of the desired mineral(s) are separated and recovered as product 60, and a depleted brine is recirculated by pump 64 to heat exchanger 50. Mineral seed is added to the depleted brine while in separation plant 58, and the seed is conveyed to the vortex separator 68 in the depleted brine by pump 64 and lines 62 and 66. The mineral seed is recovered with the vortex separator and conveyed through line 70 and injected into the produced brine in line 54. The depleted brine, after the seed is removed in the vortex separator 68, flows into the heat exchanger 50 through line 72. A desired amount of fresh make-up water from source W is added through line 48 to form the injection fluid, which is heated by the produced brine in the heat exchanger 50. The injection fluid is conveyed to well head 46 through line 52 and injected into the mineral deposit M through annular space 42a in the concentric well string. The injection fluid leaving the heat exchanger in line 52 is reasonably warm since it is heated by the produced brine from a near-ambient temperature. The injection fluid flows countercurrently in well string annular space 42a to the produced brine flowing upwardly in the inner well string pipe 44, providing an insulating layer that helps to prevent a substantial loss of heat from the produced brine while warming the injection fluid to nearly the temperature of the mineral deposit M. The injection fluid entering the cavern in the mineral deposit M is thus reasonably warm, which improves the dissolution rate for dissolving the desired mineral(s) in the deposit M and increases the amount of the desired mineral that can be dissolved in a given quantity of the injection fluid since the solubility of the desired mineral(s) depends on the temperature of the injection fluid. After a sufficient period of time to dissolve the desired mineral(s), the rich, more-concentrated produced brine is formed, which is at essentially the temperature of the mineral deposit provided the period of time was long enough to allow temperature equilibration. The produced brine is conveyed to heat exchanger 50 through inner well string pipe 44 and line 54 to continue the continuous cycle.

As the cavern is enlarged in deposit M, fresh or saline make-up water is added to fill the void left in the deposit M as mineral is removed. The source W of the make-up water is often a water well, pond, lake or a source of salt water, but the water can also be transported and stored in a tank. The water is preferably added into heat exchanger 50 as shown in FIG. 2 or into line 72, but the make-up water can be injected into the dilute brine return line 62 at the separation plant 58. However, in this case the depleted brine cannot carry seed crystals because the mineral crystals will dissolve in the diluted brine. To still accomplish seeding, a seed tank can be located near the warm end inlet 50b of the heat exchanger 50 with a pump for injecting the seeds into the production brine. One seed tank can feed multiple production wells.

Figure 3:
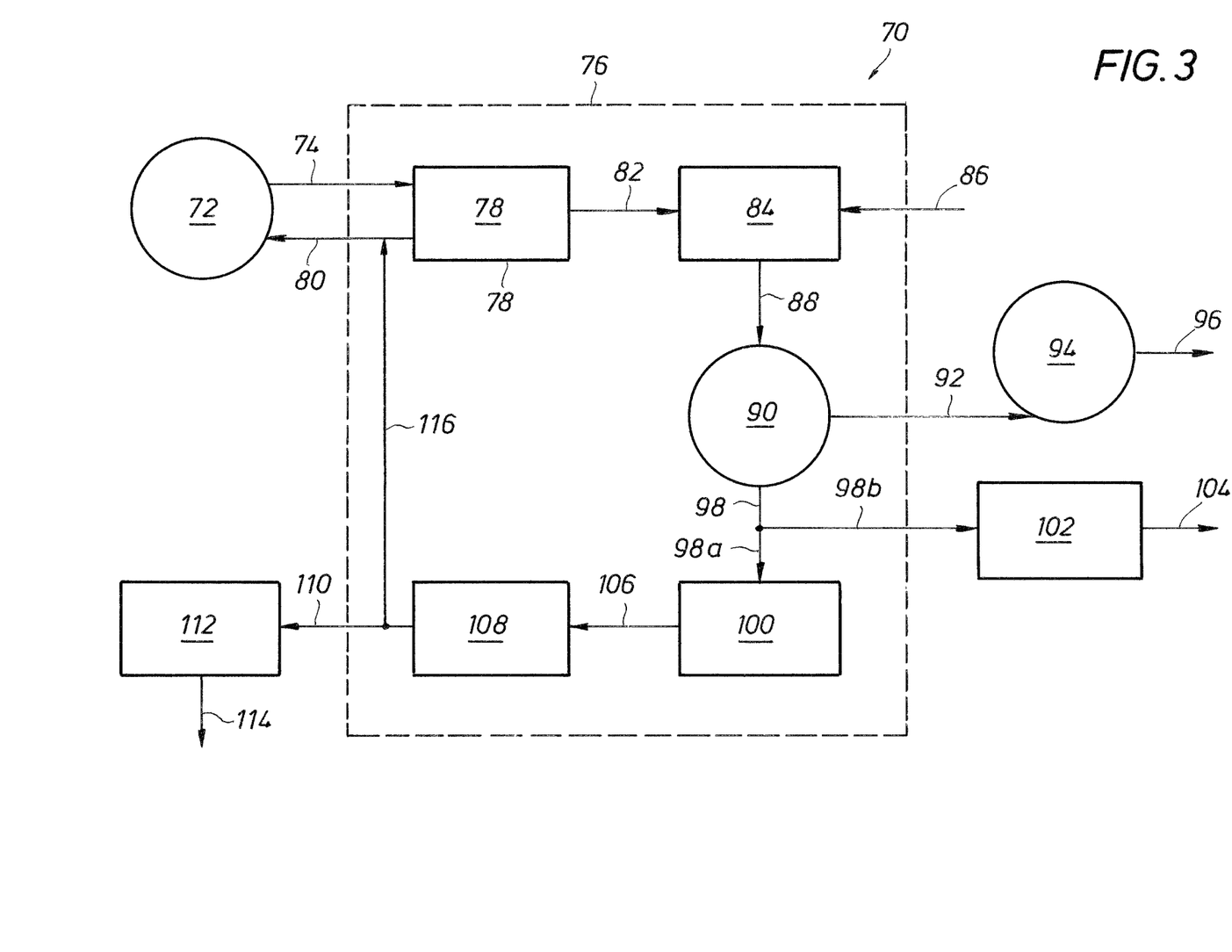
FIG. 3 is a simplified schematic representation of a solution mining process, illustrating, in particular, equipment that may be used in a separation plant for recovering mineral product and for conveying depleted brine to the heat exchanger, according to the present invention.

Turning to FIG. 3, a simplified process flow diagram 70 is shown for producing and processing a carnallite slurry, according to the present invention. The carnallite slurry is produced according to the process described with reference to FIG. 2, which is identified in FIG. 3 as step 72. Although not illustrated in FIG. 3, step 72 includes placing a concentric well string into a subterranean mineral deposit having carnallite as the desired mineral. An injection fluid dissolves the carnallite, and a production fluid is formed that is relatively warm and rich in carnallite. The production fluid is produced in step 72 and passed through the inner pipe of a pipe-in-pipe heat exchanger in step 72. The production fluid is cooled in the heat exchanger in step 72, and a slurry containing carnallite crystals is formed in step 72. The slurry is conveyed through a pipe 74 to a separation plant 76, where the slurry is fed to a separator 78, which separates the solid crystals of carnallite from the liquid brine solution in the slurry, and about 90 to about 95% of the liquid brine solution, referred to as a depleted brine, is recirculated through a pipe 80 to the heat exchanger in step 72, where heat is transferred from the produced brine to the depleted brine for cooling the produced brine and warming the depleted brine. The injection fluid comprises this warmed, depleted brine, which is used to dissolve more of the carnallite and form more production fluid in step 72 in a recirculation circuit.

Although in some applications it is possible to operate without separator 78, separator 78 is needed generally as a preliminary separator and can be a fine-aperture sieve, a sieve bend screen, a sieve bend, a wedge wire sieve bend, a cyclone, a centrifugal filter and/or a settling tank. A VARISIEVE® brand modified sieve bend separator can be used as separator 78. The solid carnallite crystals removed from the slurry by separator 78, along with the liquid brine that remained with the solid crystals, is conveyed through a line 82 to a decomposition tank 84. Fresh water is added through a pipe 86 to the carnallite crystals, causing the carnallite to decompose into solid potassium chloride, KCl, and liquid magnesium chloride, $MgCl_2$, brine. A slurry containing the solid potassium chloride and liquid magnesium chloride is conveyed from decomposition tank 84 through a line 88 to a centrifuge 90. Centrifuge 90 separates the solid potassium chloride from the liquid magnesium chloride. The liquid magnesium chloride brine flows through a pipe 92 to a holding pond 94, which may cover as much as fifty (50) acres. Magnesium chloride product 96 is recovered from the holding pond 94 by conventional means. The solid potassium chloride recovered by centrifuge 90 is conveyed by a line 98 and then through a line 98a to a dryer 100 or through a line 98b to a wet storage tank 102, from which a wet potassium chloride product 104 can be loaded. Dryer 100 removes water from the wet potassium chloride, providing dry, solid KCl crystals, which are conveyed through a line 106 to a screen 108. Screen 108 separates the particles of potassium chloride into various size ranges, and the separated potassium chloride crystals are conveyed through one or more lines 110 to dry storage facilities 112.

Dry potassium chloride product 114 is loaded onto trucks and/or rail cars. In the event that the produced crystals are not large enough to be commercial, a thickener and or a compactor can be added to the process.

A portion of a specific size range of KCl particles is conveyed through a line 116 to the low-pressure intake of the return brine injection pump (not shown). Line 116 may comprise a conveyor belt and a hopper for injecting seed particles of the potassium chloride into line 80 at a controlled rate. The solid potassium chloride particles conveyed from screen 108 to depleted brine line 80 will serve as seeds in the production side of the heat exchanger in step 72, as was discussed above with reference to FIG. 2. The depleted, return brine in line 80 will have small particles of potassium chloride that passed through separator 78, so additional seeding through line 116 is optional, but preferred. If seeding through line 116 is used, the preferred particle size or the distribution of particle sizes and the number of particles for optimum seeding should be determined by experimentation. It is believed that fewer and larger seed crystals will result in formation of larger crystals, unless too few seeds are injected, and if too few seeds are added, a large portion of the flow of produced brine will not be seeded. The optimum size and amount of seeds will depend on the minerals involved and the heat exchanger conditions and design. Precipitation of the desired minerals can also be increased by injecting a brine into the heat exchanger that contains a dissolved mineral that will displace the desired mineral. An example of this would be the injection of a MgCl2 saturated brine into a KCl brine in the heat exchanger. Depending on conditions, the phase diagram for this mixture indicates that KCl can be preferentially precipitated. Also, U.S. Pat. No. 4,283,372, issued to Frint et al. and incorporated by reference, describes a method for recovering alkali value from sodium bicarbonate-containing ore by utilizing an aqueous solvent containing ammonia.

FIGS. 2 and 3 together provide a simplified description of a method for solution mining an underground, in situ mineral source according to the present invention. With FIG. 2, a description is provided for producing brine containing a desired mineral, cooling the brine in a heat exchanger and thereby causing the desired mineral to precipitate, and transferring the heat from the produced brine to the depleted brine returned from the separation plant. The depleted brine is used to convey seed crystals from the separation plant to the heat exchanger, where vortex separator 68 removes the seed crystals for injection into the produced brine upstream of the heat exchanger. With FIG. 3, a description of one embodiment of a separation plant is provided, which describes separation and recovery of the desired mineral product and of seed crystals that can be used to seed the produced brine. The heat exchange system described for the present invention is also useful in situations where it is necessary or desirable to dispose of the dilute brine stream. In this case, a mineral-dissolving fluid, which is typically fresh or saline water, is introduced into the heat exchanger, where the dilute or depleted brine stream would otherwise be introduced, which cools the produced brine while heating the mineral-dissolving fluid before it is injected into the mineral deposit.

Turning now to heat exchanger 50 in FIG. 2, many types of heat exchangers are applicable to this invention, provided that the precipitating crystals do not plug the heat exchanger and other requirements, such as heat transfer area, are satisfied. However, pipe-in-pipe heat exchanger 50 in FIG. 2 is particularly suitable for this application for the following reasons: it is inexpensive; it can be constructed and repaired in the field; it can be easily lined or coated to minimize salting; it can easily be elongated to reduce the average temperature drop across the wall to the warm fluid; and it can be used as a significant part of the fluid connection between the well and the separation plant. A high temperature drop across the exchanger wall promotes salting. Shell and tube heat exchangers, which are typically used in plants because of their compactness, can also be used, but do not provide the above advantages. It is also possible to install a pipe-in-pipe heat exchanger in the production well itself, using smaller tubes to inject seeds and other brine if required. This would not normally be the preferred installation because of the difficulty of servicing the exchanger. However, with long experience with a given ore body, where service of the surface exchanger has become minimal, the in-the-well approach could become preferable in that it would make use of the concentric tubing already in place for injection into and production from the well. The concentric well string configuration illustrated in FIG. 2 effectively extends the heat exchanger into the well for added exchanger surface area, although it does not include the ability to seed or to inject a brine into production conduit 44 proximate to mineral deposit M for promoting crystallization in the production brine while in production conduit 44.

It may be necessary to use an auxiliary heat exchanger in addition to heat exchanger 50 in FIG. 2, although such an exchanger is not shown in the drawings. Many, if not most ore bodies, do not have a large enough temperature elevation to produce sufficient precipitation at the surface. In this case, an auxiliary external heat exchanger may be used. The auxiliary heat exchanger can be installed in line 52 in FIG. 2 between heat exchanger 50 and the injection well head 46 to heat the injection fluid. The source of heat for the auxiliary heat exchanger can be low grade natural gas, process heat such as from a power plant, solar heat, etc. At least part of the heat generated by the auxiliary heat exchanger would be recovered by heat exchanger 50 from the brine produced from the cavern. Warmer injection fluid would yield a production brine containing a higher concentration of the desired mineral due to a warmer temperature in the production brine. Whether this approach is economical depends on the cost of the auxiliary energy source and on the cost of alternative methods for recovering the desired mineral. However, using an auxiliary heat exchanger to heat the injection fluid has advantages over using a different type of cooling system for cooling the produced brine in that virtually any source of auxiliary heat can be used, in the simplicity of the equipment (particularly the pipe-in-pipe heat exchanger), and in the fact that the natural heat in the mineral deposit is recovered and used productively. If the heated injection brine is warmer than the ore body, it would be preferable to use injection and production conduits that are separated rather than a concentric pipe string.

Summarizing, the present invention provides a system and a process for solution mining in which a heat exchanger is used to cool production brine containing a dissolved mineral coming from an ore body, such that the mineral precipitates, while previously depleted cool brine in a heat exchange relationship with the produced brine, is warmed and returned to the cavern for further mineral dissolution. Preferably, the heat exchanger is of simple pipe-in-pipe design. The heat exchanger preferably forms a portion of the fluid connection between the well and a mineral-recovery process plant, which reduces piping costs. Optionally, a pipe-in-pipe type of exchanger can be installed in the production well itself instead of on the surface (or in addition to a surface-mounted heat exchanger), with tubing attached thereto for the injection of seeds and other brine as desired.

Warmed, re-injected brine is preferably in a heat exchange relationship with the tubing carrying the production brine in the well from the cavern, minimizing the cooling of the production brine and thus minimizing precipitation in the production tubing. If desired, a second heat exchanger can be placed between the first heat exchanger and the wellhead in order to further warm the depleted, re-injected brine beyond the capability of the first exchanger, where the second heat exchanger uses a source of heat other than that coming from the production well. The heat exchanger area can be increased if desired so as to reduce the mean temperature across the inner pipe wall of the heat exchanger, thus lowering the temperature difference between the wall and the production brine and thereby reducing potential for salting on the heat exchanger wall.

The present invention preferably further provides seeds of the desired mineral selected for size and number that are injected into the brine production side of the heat exchanger to form nuclei to promote precipitation of the mineral, the amount and size distribution of such injection being used to determine the mineral crystal size emanating from the exchanger and to minimize salting on the exchanger wall. In one embodiment, the precipitating side of the heat exchanger is coated or lined with a substance that minimizes precipitation on the exchanger wall.

This invention improves upon both the refrigeration-induced precipitation process and the evaporative process. With respect to the former it provides an immensely simpler and lower cost capital investment and a very much lower operating cost in terms of energy used. Although both selective and non-selective solution mining methods can be used with this invention, selective mining minimizes the amount of water used, primarily make-up and water for decomposition of a mineral like carnallite, and there is almost zero waste left on the surface. This is in stark contrast to most solution mining projects. The present method can use fresh water or saline water. A mine using this process may well be one of the cleanest mines in existence. With non-selective mining, saline water can be used, and subsurface brine disposal would be preferred. Depending on the mineral being mined, there may be no requirement for separation since no salt is precipitated. As compared with an evaporative process, the advantages include the above, but are even greater. No water is lost to evaporation, which is expensive and is an environmental burden, often no separation of minerals on the surface is needed, and no mine tails are left to create an environmental problem.

Comparing the present invention to a typical prior art process for solution mining of potash, described in U.S. Pat. No. 3,918,916, issued to Garrett and incorporated by reference, the present invention is much simpler, much less expensive to build, to operate and to maintain and more reliable. The '916 patent is believed to describe a process for solution mining potassium chloride that comprises the steps of:

(a) mining a potash deposit by injecting a dissolution fluid into the potash deposit, dissolving potash with the dissolution fluid and producing a relatively warm, potassium chloride-rich brine referred to as a produced brine;

(b) conveying the produced brine to a first-stage heat exchange crystallizing station comprising shell and tube heat exchangers whereby the temperature of the produced brine is lowered to form a slurry containing crystals of potassium chloride referred to as a first-stage slurry;

(c) conveying the first-stage slurry to a second-stage cooler comprising an atmospheric cooler in which the temperature of the first-stage slurry is further reduced by heat exchange using cold, ambient air thereby forming additional crystals of potassium chloride in a slurry referred to as a second-stage slurry;

(d) conveying the second-stage slurry to a third-stage crystallizing station comprising refrigerative cooling for reducing the temperature of the second-stage slurry thereby forming additional crystals of potassium chloride in a slurry referred to as the third-stage slurry;

(e) recovering potassium chloride crystals and a relatively-cool depleted brine from the third-stage slurry using physical-separation equipment;

(f) recirculating the relatively-cool depleted brine to the first-stage heat exchange crystallizing station in which a transfer of heat cools the produced brine and warms the relatively-cool depleted brine thereby forming a warmed depleted brine; and (g) using the warmed depleted brine in the dissolution fluid.

In the '916 patent, the first-stage heat exchange crystallizing station preferably includes initially passing the produced brine through a multi-stage vacuum growth-type crystallizer. The present invention is an improvement over the prior art method described in the '916 patent in that the second-stage cooler and the final crystallizing station are eliminated with the present invention. The second-stage atmospheric cooler in the '916 patent is essentially a cooling tower in which the brine flows downwardly over a set of baffles while a fan draws air upwardly through the baffles for cooling the brine by sensible heat exchange and by evaporating water from the brine. The heat in the produced brine is lost to the atmosphere, and the cooling tower is relatively expensive to build and maintain as compared to the heat exchanger in the present invention. Secondly, the heat exchanger in the present invention takes full advantage of the heat in the mineral deposit in that the heat in the produced brine is nearly fully recovered in the heat exchanger of the present invention. While the first-stage heat exchange crystallizing station comprising shell and tube heat exchangers described in the '916 patent exchange heat between the produced brine and the depleted, return brine, the recovery of the heat in the produced brine is quite limited as evidenced by the need to have the second-stage atmospheric cooler in even cold climates, and additionally, the third-stage refrigerative cooling in climates that are not cold. The heat exchanger in the present invention is adapted to take advantage of heat transfer from the produced brine to the ambient environment and to have sufficient heat transfer area between the produced brine and the depleted, return brine to sufficiently cool the produced brine so that a substantially greater amount of potassium chloride crystals is recovered than could be recovered using the first-stage heat exchange crystallizing station alone without the second-stage atmospheric (evaporative) cooler and without the third-stage refrigerative cooler.

The heat exchanger in the process of the present invention gradually reduces the temperature of the production brine to a point where a desired or optimal amount of the produced mineral is crystallized in a single stage and in a single and simple piece of equipment, which is the heat exchanger. While the '916 patent describes a plurality of shell and tube heat exchangers in which some limited amount of heat is transferred from the produced brine to the depleted, return brine, the '916 patent does not contemplate sufficiently reducing the temperature of the produced brine to adequately crystallize the desired mineral using only the depleted, return brine and ambient conditions to effect the required cooling of the produced brine. The '916 patent instead contemplated second-stage evaporative cooling and third-stage refrigerative cooling. The present invention particularly contemplates a pipe-in-pipe heat exchanger, which should be designed to reduce the temperature of a produced brine an amount comparable to the reduction that would be achieved by the heat exchangers, evaporative coolers and refrigerative coolers described in the '916 patent.

Therefore, with respect to the '916 patent, the present invention provides improvements comprising: (i) eliminating the second-stage cooler and the final crystallizing station; (ii) using a pipe-in-pipe heat exchanger instead of the first-stage heat exchange crystallizing station comprising shell and tube heat exchangers for exchanging heat between the produced brine and the relatively-cool depleted brine, wherein the pipe-in-pipe heat exchanger is adapted to take advantage of heat transfer from the produced brine to the ambient environment and to have sufficient heat transfer area between the produced brine and the depleted brine to sufficiently cool the produced brine so that a substantially greater amount of potassium chloride crystals is recovered than could be recovered using the first-stage heat exchange crystallizing station alone without the second-stage evaporative cooler and without the third-stage crystallizing station that uses refrigerative cooling. The reduction in the temperature of the concentrated production brine between the production conduit and the separation plant is achieved without using significant evaporative cooling and without using significant refrigeration. The reduction in the temperature of the concentrated production brine between the production conduit and the separation plant is achieved essentially by transferring heat energy from the concentrated production brine to the dilute brine stream in the one or more heat exchangers and by a transfer of heat energy from the concentrated production brine to the ambient environment through the pipe. Stating this another way, heat is exchanged between the concentrated production brine and the depleted brine in the heat exchanger for cooling the production brine and for heating the depleted brine, wherein the heat energy lost as the production brine cools is gained as heat that warms the dilute brine and by a transfer of heat energy to the ambient environment through the piping system and through liquid-solid separation equipment used to recovered solid crystals of the desired mineral.

While the solution mining process described in the '916 patent requires man-made energy in the form of electricity to run a fan in the evaporative cooler and in the refrigerative cooling system, the heat exchange system of the present invention, which is used to cool the production brine, employs no significant man-made source of energy to cool the production brine. The heat exchange system of the present invention thus serves as a single crystallizer as compared to the solution mining process described in the '916 patent, which requires a first stage comprising shell and tube heat exchangers, a second stage evaporative cooling system that uses something like a cooling tower and a refrigeration system as a third stage, if needed depending on the ambient temperature conditions. To a certain extent, the present invention uses the ambient environment as a heat sink (through natural convective loss of thermal energy) for cooling the produced brine, but most of the thermal energy lost from the produced brine (as it cools to precipitate the desired mineral) is recovered in the depleted brine and returned to the mineral deposit (so minimal thermal energy is lost from the mineral deposit). If the thermal energy losses to the ambient environment are too great, auxiliary heat should be added to the depleted brine before it is injected into the mineral deposit. Additionally, the exchanger, surface pipelines and the process equipment can be insulated to minimize these losses.

The present invention further contemplates a long distance between the well head and the separation plant, and in the prior art a pipe would have been installed to convey the production brine and/or slurry to the separation plant, which would likely also include equipment such as described in the '916 patent for cooling the produced brine. In the present invention, a second pipe is installed in a concentric configuration around the pipe used to convey the production brine to the separation plant, which then provides the pipe-in-pipe heat exchanger of the present invention. Thus, essentially, all of the capital cost and maintenance cost of the shell and tube heat exchangers, the evaporative coolers and the refrigerative coolers in the '916 patent are reduced to the cost of installing the second pipe around the first pipe to form the pipe-in-pipe heat exchanger of the present invention. The capital cost and maintenance cost of the pipe-in-pipe heat exchanger of the present invention is minimal compared to the shell and tube heat exchangers, the evaporative coolers and the refrigerative coolers described in the '916 patent. The reliability and ease of maintenance of a pipe-in-pipe heat exchanger of the present invention is a further advantage and benefit. The inside walls of the pipe carrying the production brine through the heat exchanger of the present invention can be easily coated or lined to inhibit salt formation on the inside walls of the pipe, and the minimal temperature difference between the produced brine on one side of the heat exchanger and the depleted brine on the other side further reduces the tendency for salt to accumulate on the inside walls of the production conduit in the heat exchanger of the present invention. As described above, the present invention offers a number of benefits and advantages as compared to prior art systems typified by the '916 patent.

In considering the overall energy balance, there is a loss of thermal energy to the ambient environment during processing in the mineral-extraction equipment in the separation plant. Consequently, the depleted brine conveyed to the heat exchanger is at near-ambient temperature, which provides cooling for the production brine in the heat exchanger. However, since the heat exchanger is designed to provide essentially all cooling for the production brine other than for losses to the ambient environment, the temperature of the production brine as it exits the heat exchanger is also at near-ambient temperature, although at a higher temperature than the depleted brine. The temperature difference between the production brine at its exit end of the heat exchanger and the depleted brine at its entrance end of the heat exchanger is minimal, which helps to minimize salting out on the inside wall of the heat exchanger on the production-brine side where precipitation of mineral occurs. Factors to consider in the overall energy balance include the thermal energy that the production brine will have as it leaves the mineral deposit, as the source of the thermal energy is the elevated temperature of the mineral deposit compared to the ambient surface temperature, losses in the production conduit primarily to the depleted brine injection fluid in a concentric tubing arrangement as described with reference to FIG. 2 but also to the surrounding earth from the injection fluid and from the production brine, losses to ambient from the well head and from piping between the well head and the heat exchanger, transfer of heat from the production brine to the depleted brine in the one or more heat exchanger(s), loss of heat to the ambient environment from the pipe or other conduit used for conveyance between the heat exchanger and the separation plant, loss of heat to the ambient environment in the separation plant, gain of heat from pumping the depleted brine to the heat exchanger, gain of radiant heat from the sun shining on exposed equipment and piping, loss of heat to the ambient environment in the seeding circuit such as from the vortex separator, and gain of heat to the depleted brine if an auxiliary heater is used to heat it prior to injection into the deposit. Heat transfer to the ambient environment depends on the ambient temperature, which is generally variable. A pipe-in-pipe heat exchanger can be buried below ground at the earth's surface, which would provide a reasonably constant ambient temperature and eliminate some of the variability in the exit temperature of the production brine from the heat exchanger, although the depleted brine would still be subject to variability because the separation equipment would be located presumably in an open-air environment. As one can see, a number of factors should be considered in the design of the one or more heat exchanger(s).

The preferred heat exchanger of the present invention is envisioned as a single pipe-in-pipe heat exchanger having a very long length, possibly about a mile in length. This type of exchanger can be constructed on-site where the mine is located. A single separation plant can accommodate a number of production wells, and the production brine from each production well can be conveyed from its well to the separation plant through a pipe-in-pipe heat exchanger. However, in some applications, it may be preferred to build heat exchangers in a factory or to simply buy off-the-shelf heat exchangers that a heat exchanger manufacturer has made for general use. Different types of heat exchangers can be used, and more than one heat exchanger can be used in either a parallel or a serial combination or in a mix of parallel and serial. For example, a standard-length, pipe-in-pipe heat exchanger may be available off-the-shelf, and multiple units can be assembled in series to convey the production fluid to the separation plant while exchanging heat with the depleted brine. Heat exchanger selection and design should be based on factors including capital cost, operating cost, maintenance—particularly with respect to salt plugging and corrosion, and ease of installation and operation. The heat exchanger should be designed to provide essentially all of the reduction in temperature of the production brine required to yield a desired production of the desired mineral, taking into account the net loss of thermal energy to the ambient environment.

EXAMPLE

Solution Mining an Ore of Sylvite

As an illustrative and hypothetical example, an evaporite bed consisting of halite (NaCl) and sylvite (KCl) has a temperature of 150° F. as obtained from a down-hole temperature survey. The bed is 50% sylvite and 50% halite, which allows the bed to be selectively leached. In selective leaching only the more soluble sylvite is dissolved, and the halite remains in place. Mining is initiated by performing an undercut at the bottom of the bed. This is done by installing an immiscible fluid like oil a few feet above the bottom of the target bed. Solution mining then takes place under the pad, mining in a radial direction away from the well. This produces a circular disc about 2 feet high with a diameter of about 200 feet. Once the undercut is complete, after about 100 days, the pad that prevents the undercut from leaching upwards is removed and production leaching is started by leaching upwards. The flow rate of the injection brine is adjusted so that the produced brine is slightly under-saturated in the cavern. It arrives at a pipe-in-pipe heat exchanger at approximately 145° F. and fully saturated with about 16% KCl, based on a KCl—NaCl—$H_2O$ phase diagram available in the literature. Passing through the heat exchanger, which may be about 5,000 feet long but is as long as needed, the production brine drops nearly to a local ambient temperature of about 60° F., at which point the KCl concentration has dropped to about 10%, a drop of about 6% by weight, which forms a slurry of KCl crystals in the produced brine. The slurry flows to a process or separation plant, where solid KCl crystals above a certain size are separated and processed as described in connection with FIG. 3. With solids thus removed, a now-depleted brine is returned through a separate pipe to the heat exchanger using high-pressure pumps, where it is heated by warm production brine, and injected back into the cavern to continue the process. The depleted brine recovered at the separation plant is still saturated in KCl, but the brine is at the lower ambient temperature so less KCl is soluble in the brine at the lower temperature. Because the KCl precipitated in the heat exchanger, where no halite is available, the brine is no longer saturated in halite, and can be considered a dilute brine in this sense. Leaching continues in the cavern until the top of the ore bed is reached and another well must be drilled, assuming there is only one bed in the well. This example concerns solution mining of sylvite, as opposed to carnallite, and the decomposition tank used in the solution mining process for carnallite described with reference to FIG. 3 is not needed for mining sylvite. The exact dimensions of the heat exchanger, length and diameter, and its heat transfer area should be determined by numerical analysis using the specific conditions of a mining project. In this example the high KCl content in the ore allows for selective leaching. However, non-selective leaching can also be used with the present invention. If the ore body is for instance 25% KCl, selective leaching would probably not be successful. In this case, fresh or saline water can be injected into the heat exchanger, where before the return, depleted brine was injected. The fresh or saline water is warmed in the heat exchanger by the produced brine before injection into the mine, and the higher temperature of the dissolution fluid increases the rate of dissolution and possibly the amount of KCl carried in the produced brine formed, depending on whether equilibrium is reached with the temperature of the body of ore. When the resulting production brine goes through the center pipe of the heat exchanger, KCl is precipitated as before and is separated in the plant. At this point, however, the now dilute brine is disposed of, typically in a disposal well, but some could also be sold for different uses. This brine is replaced by fresh or saline water as discussed above. Again, since the return water is too dilute to maintain seeds, a separate seed injection method is required. This could be a seed tank as discussed above or a small separate seed pipeline.

Having described the invention above, various modifications of the techniques, procedures, materials, and equipment will be apparent to those skilled in the art. It is intended that all such variations within the scope and spirit of the invention be included within the scope of the appended claims.

What is claimed is:

1. In a process for mining a mineral from the earth by circulating a fluid through a deposit of the mineral in the earth for dissolving the mineral; forming crystals of the mineral on the surface of the earth by cooling the circulating fluid in a crystallization system; and recovering the mineral from the circulating fluid with a separation plant, the improvement comprising:

using a means for conveying the circulating fluid some distance to the separation plant as a means for cooling the circulating fluid for forming the crystals in the means for conveying the circulating fluid some distance to the separation plant, wherein the means for conveying the circulating fluid some distance to the separation plant provides the crystallization system without using significant evaporative or refrigerative cooling.

2. The improved process of claim 1, wherein the means for cooling the circulating fluid comprises a heat exchanger for transferring heat from a warmer first fluid to a cooler second fluid without direct contact between the first and second fluids, and wherein each of the first and second fluids comprises the circulating fluid.

3. The improved process of claim 1, wherein the means for cooling the circulating fluid comprises:

an inner pipe having an inlet end and an opposing outlet end and a length between the inlet and outlet ends; and
an outer pipe surrounding the inner pipe for essentially the length of the inner pipe,
wherein the inner pipe has an outer surface and the outer pipe has an inner surface,
wherein an annular space is defined between the inner surface of the outer pipe and the outer surface of the inner pipe,
wherein the outer pipe is sealed with the inner pipe proximate to the inlet end of the inner pipe and proximate to the outlet end of the inner pipe, thereby enclosing the annular space,
wherein the outer pipe has an outlet port proximate to the inlet end of the inner pipe,
wherein the outer pipe has an inlet port proximate to the outlet end of the inner pipe,
wherein the inner pipe has an inside wall surface that defines an inner fluid flow path between the inlet end and the outlet end of the inner pipe,
wherein an annular fluid flow path is provided from inlet port of the outer pipe through the annular space to the outlet port of the outer pipe, and
wherein the circulating fluid flows through the inner fluid flow path and through the annular fluid flow path.

4. The improved process of claim 3, wherein at least one surface of the inner or outer pipe is coated or lined with a substance for minimizing precipitation of the mineral on the coated or lined surface.

5. A process for solution mining, comprising the steps of:
providing an injection conduit into an underground, in situ mineral source, wherein the injection conduit is adapted to convey an injection fluid into the mineral source for dissolving the mineral and forming a concentrated production brine;
providing a production conduit into the mineral source adapted to convey the concentrated production brine to the surface, of the earth;
injecting the injection fluid into the injection conduit;
conveying the concentrated production brine through a crystallizer to a separation plant, wherein crystallization in the crystallizer is caused by cooling the concentrated production brine, wherein the crystallizer consists essentially of a heat exchange system;
extracting the mineral from the concentrated production brine thereby forming a dilute brine stream and a mineral stream;
conveying the dilute brine stream through the heat exchange system to the injection conduit, wherein the injection fluid comprises the dilute brine stream; and
cooling the concentrated production brine with the dilute brine stream in the heat exchange system.

6. The process of claim 5, wherein the heat exchange system consists essentially of one or more pipe-in-pipe heat exchanger(s) for exchanging heat between the concentrated production brine and the dilute brine stream.

7. The process of claim 6, wherein the one or more pipe-in-pipe heat exchanger(s) also serves as a primary means for conveying the concentrated production brine to the separation plant and for conveying the dilute brine stream to the injection conduit.

8. The process of claim 5, further comprising seeding the concentrated production brine to promote crystallization of the mineral.

9. The process of claim 5, wherein the heat exchange system consists essentially of a pipe-in-pipe heat exchanger for exchanging heat between the concentrated production brine and the dilute brine stream; wherein the pipe-in-pipe heat exchanger includes a first pipe for conveying the concentrated production brine, and wherein the first pipe is coated or lined with a substance adapted for minimizing precipitation of the mineral on the wall of the first pipe.

10. The process of claim 5, wherein the step of cooling the concentrated production brine with the dilute brine stream in the heat exchange system occurs below the surface of the earth.

* * * * *